United States Patent [19]

Muraoka et al.

[11] Patent Number: 4,493,101
[45] Date of Patent: Jan. 8, 1985

[54] ANTI-HOWL BACK DEVICE

[76] Inventors: Shigetaro Muraoka, 7-28, Osaki 2-chome, Shinagawa-ku, Tokyo; Mineo Sakamoto, 16-12, Suido 2-chome, Bunkyo-ku, Tokyo, both of Japan

[21] Appl. No.: 434,424

[22] Filed: Oct. 14, 1982

[30] Foreign Application Priority Data

Oct. 14, 1981 [JP] Japan .............................. 56-163998

[51] Int. Cl.³ ............................................ H04B 15/00
[52] U.S. Cl. ...................................................... 381/93
[58] Field of Search ........................... 381/71, 83, 93; 179/100 L, 170.2

[56] References Cited

U.S. PATENT DOCUMENTS 3,894,200 8/1975 Campanella et al. ............. 179/170.2
4,153,815 5/1979 Chaplin et al. ........................ 381/71

FOREIGN PATENT DOCUMENTS 56-100596 8/1981 Japan ..................................... 381/93

Primary Examiner—Keith E. George
Attorney, Agent, or Firm—Wenderoth, Lind & Ponack

[57] ABSTRACT

An anti-howl back device which includes various devices and a CPU that controls these devices, their decisions, and their processings in order to output the signals which are fed into a selector circuit upon the removal of acoustic feedback components in a manner that makes a decision on presence of a synchronous signal and an address signal in combination in the output from the selector circuit. Upon the affirmative result of such a decision, an A-D converter carries out an A-D conversion of the sample obtained by a sampling performed in synchronism with a synchronous signal and then subtracts the data which has been fetched from an address in a memory system corresponding to the address signal in combination with the synchronous signal from the data derived as a result of the A-D conversion. The new data thus obtained is then stored in the memory system while being concurrently delivered to a D-A converter. A multiplexer then carries out an addition to the output from the D-A converter of the synchronous signal and the address signal corresponding to the address of the new data that has been stored in the memory system. Upon a negative result of the decision, the A-D converter carries out an A-D conversion of the sample obtained by a sampling performed by a given timing and then stores the new data thus obtained in the memory system while concurrently delivering such new data to the D-A converter. A multiplexer adds to the output from the D-A converter the synchronous signal and the address signal corresponding to the address of said new datum that has been planted in the memory system.

2 Claims, 13 Drawing Figures

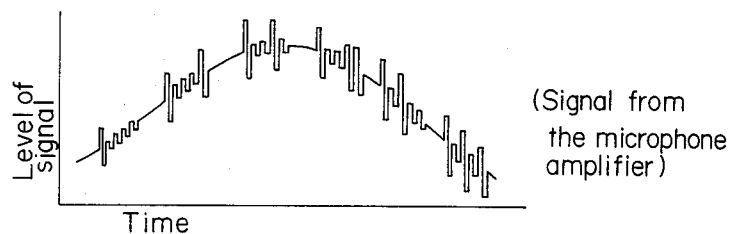
(Signal from the microphone amplifier)
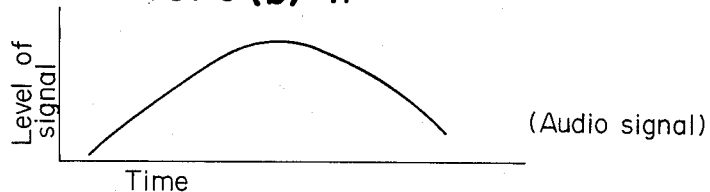
(Audio signal)
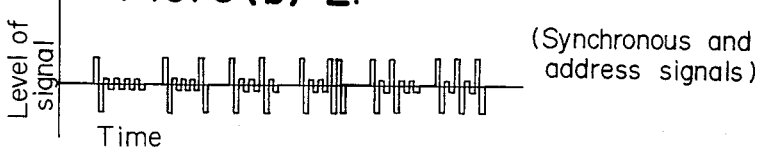
(Synchronous and address signals)
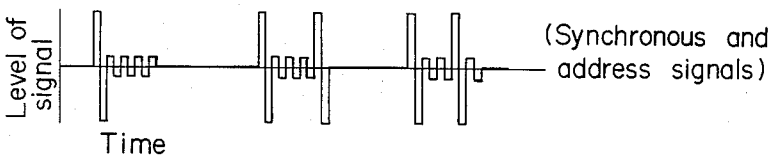
(Synchronous and address signals)
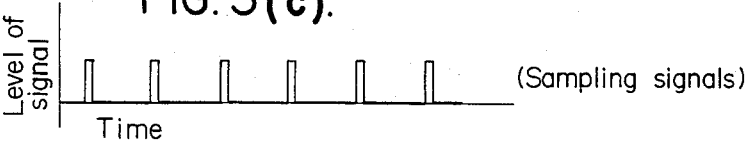
(Sampling signals)

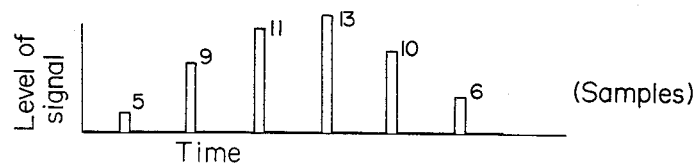
FIG. 3(d). (Samples)
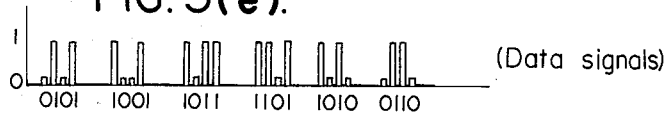
FIG. 3(e). (Data signals)
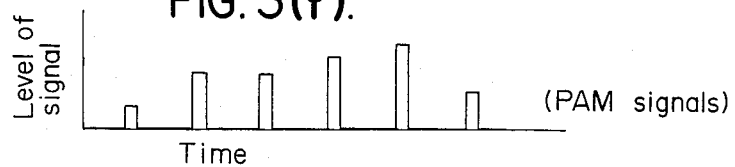
FIG. 3(f). (PAM signals)
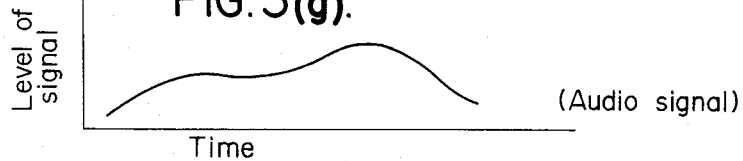
FIG. 3(g). (Audio signal)
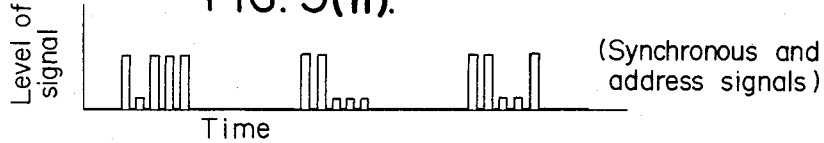
FIG. 3(h). (Synchronous and address signals)

ANTI-HOWL BACK DEVICE

BACKGROUND OF THE INVENTION

This invention relates to an anti-howl back device for prevention of an oscillation phenomenon present in various audio systems, cable or wireless communication systems and the like, caused by an acoustic feedback of an output signal from an output means to an input means.

Soundwaves or vibrations radiated by a speaker, if fed into a microphone or especially an input amplifier stage, causes the generation of a continuous vibration having certain frequency. Not only soundwaves or vibrations but also any of other type of signal, if an acoustic feedback from an output means to an input means occurs, an oscillating phenomenon will likewise occur.

Such phenomenon brings about inconveniences at various occasions. For example, in sound reinforcement systems including microphones, amplifiers, etc. used at a concert, such that the least carelessness in turning a microphone on often immediately causes an acoustic feedback of the output from speakers to the microphone resulting in an oscillation phenomenon. It is also well known that simultaneous talk over a cable or wireless communication system is very difficult because of such an oscillation phenomenon as caused by an acoustic feedback of an output signal.

SUMMARY OF THE INVENTION

The object of this invention is to provide a solution to the root of the problems of such oscillation phenomena heretofore described.

A further object of this invention is to prevent howling during the use of various audio systems, sound reinforcement systems and cable or wireless communication systems.

Another object of this invention is to make possible free simultaneous talk over various communication systems through the prevention of howling.

A still further object of this invention is to effect the prevention of howling by means of a reliable and compact system. To this end, the present invention provides an anti-howl back device comprising a selector circuit that separates an input signal into a synchronous signal and an address signal arranged as a pair and an audio signal; an A-D converter that provides an A-D conversion of the audio signal; a D-A converter that provides a D-A conversion of the signals processed in a CPU which will be described hereinafter; a multiplexer that provides an adding operation of a synchronous signal and an address signal arranged as a pair to the output signal from the D-A converter; a memory system that stores the program for the CPU which will be described hereinafter the data processed thereby; and a CPU that determines the presence of a synchronous signal and an address signal arranges as a pair in the output from the selector circuit, and with the affirmative result of such a determination, causes the A-D converter to carry out an A-D conversion of the sample obtained by a sampling performed in synchronism with the synchronous signal, subtracts the data fetched from an address in the memory system corresponding to the address signal arranged as a pair with the synchronous signal from the data derived as a result of said A-D convertion, stores the new data thus obtained in the memory system concurrently with delivering said new data to the D-A converter, and then causes the multiplexer to carry out an addition of the output from the D-A converter to the synchronous signal and the address signal corresponding to the address of the new data that has been stored in the memory system; or, with the negative result of the determination, causes the A-D converter to carry out an A-D conversion of the sample obtained by a sampling performed by a given timing, and as noted above, storing the new data thus obtained in the memory system concurrently with delivering such new data to the D-A converter, and then causes the multiplexer to carry out an addition of the output from the D-A converter to the synchronous signal and the address signal corresponding to the address of said new data that has been stored in the memory system.

The above and other novel features of the invention will more fully appear from following description when the same is read in connection with the accompanying drawings. It is to be expressly understood, however, that the drawings are for the purpose of illustration only and not intended as a definition of the limits of the invention.

BRIEF DESCRIPTION OF THE DRAWINGS

FIGS. 3 ($3(a)$–$3(h)$) is a drawing outlining each signal fed to and generated by each device.

DETAILED DESCRIPTION OF THE INVENTION

A detailed description of the preferred embodiment of this invention applied to an interphone system will be given hereunder, with specific reference to the drawings.

Figure 1:
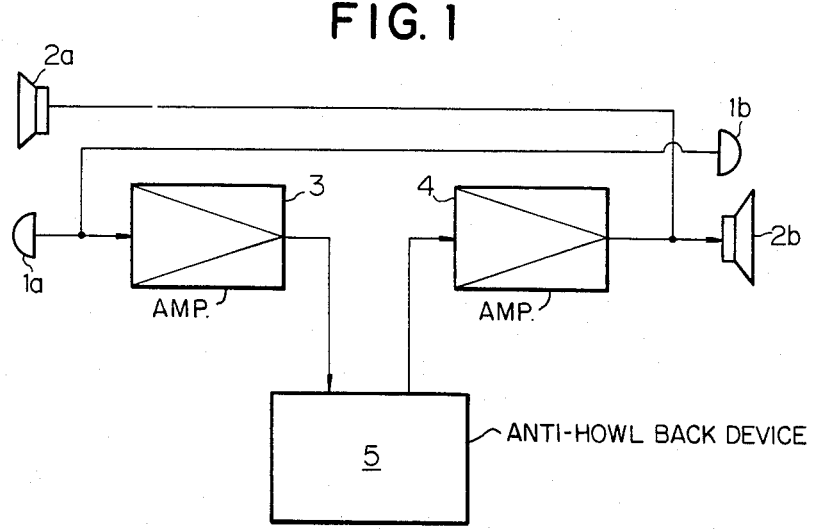
FIG. 1 is a block diagram of an interphone which is a preferred embodiment of this invention.

Referring to FIG. 1, numerals 1a and 1b respectively represent microphones so installed at each side of a pair of talkers engaged in a dialogue as to, when the main switch (not shown) is set to "ON", receive speech continuously; not alternately. Numerals 2a and 2b respectively represent speakers so installed in pairs with the aforementioned microphones 1a and 1b, at each side of the talkers engaged in a dialogue as to radiate simultaneously the voices of both of the talkers which have been received by the aforementioned microphones 1a and 1b, and amplified by amplifiers noted below.

Numeral 3 represents a microphone amplifier that provides amplification of the audio signal received by the microphones 1a and 1b to a given level high enough to drive a power amplifier 4 provided downstream of the microphone amplifier 3. Numeral 4 represents a power amplifier that electrically amplifies the output signal from the microphone amplifier 3, and drives the speakers 2a and 2b.

Numeral 5 represents an anti-howl back device so designed that it feeds the output signal from the microphone amplifier 3 into the power amplifier 4 while only removing the howling component. The anti-howl back device 5 is now described in detail with particular reference to FIG. 2.

Numeral 6 represents a selector circuit comprising a highpass filter a lowpass filter that separates the input signal into high frequency and audio frequency components. The high frequency component is a signal component composed of synchronous and address signals. The high frequency component which is output from selector circuit 6 is mixed with an audio signal and is then entered into it after passing through the hereinafter described process.

Numeral 7 represents an A-D converter comprising a sampling circuit 7a, a quantization circuit 7b, and an encoding circuit 7c. The sampling circuit 7a provides the sampling in synchronism with a sampling signal delivered by a CPU 8; the quantization circuit 7b quantizes the sample thus obtained from the sampling circuit 7a and the encoding circuit 7c encodes the quantized sample from the quantization circuit 7b. In quantization circuit 7b, determining the number of quantization bits is a problem. This may, however, be determined depending on the purpose of the system application. For use in an interphone system like in this preferred embodiment of this invention, for example, 10 bits or less can be used since such a system does not require a very high level of sound quality and some quantization noise can be tolerable.

Numeral 8 represents a CPU that controls each device which will be described hereinafter and a logic operation process in addition to the control of the A-D converter 7.

First of all, the sampling signal is delivered to the A-D converter in the following manner:

The high frequency component, after passing through the high pass filter of the selector circuit 5, is then fed into the CPU 8 whereby a decision is made as to the presence of the synchronous signals and address signals contained within the high frequency component. With an affirmative result of the decision, the sampling signal is output from the CPU 8 in synchronism with the synchronous signal; alternatively, with a negative decision result, a sampling signal unique to the CPU 8 is output therefrom.

The presence of both the synchronous signals and the address signals is determined on the basis of whether or not such signals are input within a given waiting time.

The unique sampling signal from the CPU 8 can be two or more times higher in frequency than that of the desired speech band as selected by dividing the clock frequency of the CPU 8. It, therefore, varies in proportion to the range of speech band desired. For example, if the speech band is set at 15 kHz, then 30 kHz or more will be adequate for the sampling signal frequency. When a sampling frequency is determined in such a manner, the same 30 kHz will be selected if a synchronous signal is added to the output audio signal as will be described hereinafter. However, the speech band can be considerably narrower and 3 kHz will be adequate. In such a case, the sampling frequency will automatically become lower and a minimum of 6 kHz will be adequate; however, 8 kHz should probably be used to allow for some margin.

Numeral 9 represents a memory system; 9a is a ROM for storing programs for operation of the CPU 8; 9b is a RAM for the temporary storage of data processed by the CPU 8.

The CPU 8 receives the data delivered by the A-D converter 7 and, upon determining the presence of the synchronous and address signals contained within the high frequency component output by the selector circuit 6, reads out data from the RAM 9b which has been stored in the address corresponding to the address signal from the selector circuit 6. The CPU 8 then subtracts the stored data from the data delivered by the A-D converter 7, and stores the new data thus obtained in a given address in the RAM 9b and at the same time delivers the new data to a D-A converter 10. Alternatively, when the synchronous signals and address signals are not found within the high frequency component output by the selector circuit 6, the CPU then stores the output data of the A-D converter 7, as it is, in a given address in the RAM 9b as new data and concurrently delivers the new data to the D-A converter 10.

Storing data in the RAM 9b is accomplished in the order of addresses in accordance with an instruction from the CPU 8. When the addresses run out, storage begins from the beginning address again. A memory capacity which is capable of storing as much data as needed for a maximum of one second may be adequate. A memory capacity of 420,000 bits or more will therefore be adequate if the sampling frequency is 30 kHz, for example, with consideration of a very high level of sound quality and the number of bits for quantization by the A-D converter 7 being 14 bits. However, for use in an interphone system like in this preferred embodiment of this invention, a memory capacity of a RAM 9b can be much less because the sampling frequency is far less and accordingly, a far lesser number of bits needed for quantization may be acceptable. Furthermore, making the data retaining time less than one second, for example, 0.5 second, will present no problems, and thus, a far lesser memory capacity can be adopted.

Numeral 10 represents a D-A converter that converts the speech data delivered by the CPU 8, and under its control, into a PAM pulse output.

Numeral 11 represents a low-pass filter that smooths out the PAM pulse output, thus restoring an audio signal.

The audio signal output by the low-pass filter 11 after D-A conversion and the synchronous signal and the address signal are mixed.

The CPU 8, while storing the new data in the RAM 9b and deliverying the new data to the D-A converter 10, also generates a synchronous signal and an address signal corresponding to the address wherein said new data has been stored and latches such a synchronous signal and an address signal so as to deliver them in synchronism with a timing by which the audio signal based on the corresponding data is output, thus subsequently causing a multiplexer 12 to perform the serial mixing of the synchronous and address signals with the audio signal that has passed through the low-pass filter 11.

Numeral 12 represents a multiplexer that provides a serial output of a synchronous signal and an address signal that were fed into it in parallel form, and, under the control of the CPU 8, mixes a synchronous signal and an address signal corresponding to the address in the RAM 9b storing said new data with the audio signal based on the given data.

The output signal from this anti-howl back device is amplified by the power amplifier 4 and is in turn radiated through speakers 2a and 2b. If speakers 2a and 2b are not capable of radiating the high frequency signal consisting of both the synchronous and the address signals because of their frequency characteristics, an adequate transducer shall be provided in parallel with speakers 2a and 2b. This applies to microphones 1a and 1b.

As has been described above, this device is designed to remove an acoustic feedback component coming in through microphones 1a and 1b, by storing its signal data in the RAM 9b at the time it was fed therein for the first time and, upon the confirmation of a re-entry signal, and by the subsequent encoding of the input signal including such a re-entry signal and concurrent fetching of the data corresponding to such input signal from the RAM 9b followed by subtraction of the data read out of the RAM 9b from the input signal containing such a re-entry component. It is therefore possible to remove the entire feedback component if the level of the signal represented by the data stored in the RAM 9b and that of the feedback component are identical. But, if they are not, they must be made identical by any means. It can, however, be easily achieved by adjusting volume of the microphone amplifier 3 because the level of the acoustic feedback signal and that of the signal represented by the data stored in the RAM 9b are often in a given proportional relationship as a whole.

For the above method, although the conditions prevailing at the place where the system is used requires an adjustment of individual devices so as to be compatible with such conditions, a following level adjustment function will eliminate the need for such considerations, thus making possible an automatic level adjustment: A function that performs the aforementioned subtraction upon the correcting of the data in the address corresponding to the address signal which is combined with the synchronous signal as has been read out from the RAM 9b according to the proportional ratio as derived from a comparison of level of the synchronous signal feed into the CPU 8 through the selector circuit 6 with level of that at the time it was delivered out from the CPU 8.

That is, the CPU 8 operates in a manner that makes a decision on presence of a synchronous signal and an address signal in pair in the output from the selector circuit 6, and then feeds a sampling signal into the sampling circuit 7a of the A-D converter 7 and, while the A-D converter 7 is encoding the audio signal, compares the level of the input synchronous signal with that of the synchronous signal as it was output from the CPU 8, thereby determining the proportional ratio and reads out the data stored in the address corresponding to the address signal from the memory system, and subsequently corrects the data thus fetched using the proportional ratio and then subtracts the data thus corrected from the output data from the A-D converter.

The correction of data by means of the proportional ratio referred to here means a multiplication of:

$$\text{Ratio} = \frac{\text{level of input synchronous signal}}{\text{level of output synchronous signal}}$$

by data from the RAM 9b.

This system is designed as described above and operates as follows:

Setting the main switch to "ON" makes possible simultaneous talk for both the talkers engaged in a dialogue at microphones 1a and 1b, and speakers 2a and 2b, without howling occurring.

Voices of both the talkers engaged in a dialogue are picked up by microphones 1a and/or 1b, amplified by the microphone amplifier 3 and then fed into the anti-howl back device 5.

The synchronous and address signals not capable of being picked up by microphones 1a and 1b due to their higher frequency characteristics are picked up by other means as described hereinbefore and are subsequently mixed into an audio signal, and likewise amplified by the microphone amplifier 3 and then fed into the anti-howl back device.

Shown in FIG. 3(a) is the output signal from the microphone amplifier 3 composed of an audio signal, a synchronous signal, and an address signal. When the audio signal picked up by microphones 1a and 1b does not contain any acoustic feedback component at all, the output signal, unlike the one shown in FIG. 3(a), needless to say, does not contain synchronous signal nor address signals.

The signal fed into the anti-howl back device 5 is separated by the selector circuit 6 into an audio signal and a signal comprising a synchronous signal and an address signal.

Figure 2:
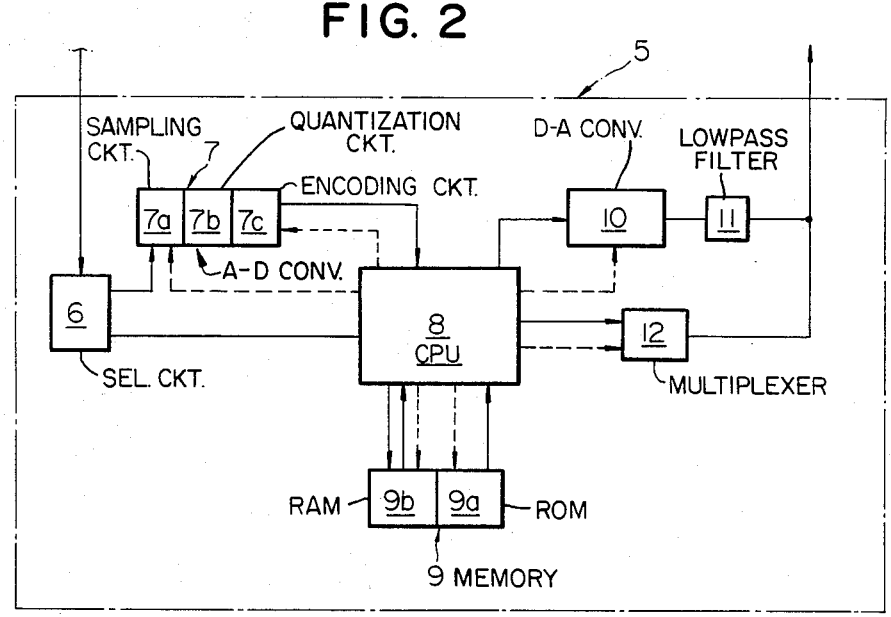
FIG. 2 is a block diagram of the circuit for an anti-howl back device which is a preferred embodiment of this invention.

Shown in FIG. 3(b)-1 is a separated audio signal; shown in FIG. 3(b)-2 is a separated signal comprising both synchronous and address signals. FIG. 3(b)-3 is a partly enlarged view of FIG. 3(b)-2. The pulse at the left side of the figure is the synchronous signal and the pulse string to its right thereof is the address signal.

The pulse string is subsequently fed into the CPU 8 for a decision on the presence of a synchronous signal and an address signal. In this case, because there are both synchronous and address signals, a sampling signal is output from the CPU 8 in synchronism with a synchronous signal.

The A-D converter 7 is connected to the selector circuit 6 so as to input the separated audio signal. When the sampling signal is output by the CPU 8, converter 7 samples the audio signal in synchronism with sampling signal, and subsequently performs quantization and encoding thereof and holds the data thus obtained until such time as an instruction will be issued by the CPU 8.

FIG. 3(c) schematically illustrates the sampling signals output from the CPU 8; FIG. 3(d) illustrates the sampling of the audio signal in synchronism with the sampling signal. FIG. 3(e) schematically illustrates encoded data of an audio signal that has been sampled.

The data from the A-D converter 7 is then input into the CPU 8 which, upon concurrently reading out from the RAM 9b data of the address corresponding to the address signal combined with the synchronous signal, carries out a subtraction of the data received from the A-D converter by the data read out from the RAM 9b. The new data thus obtained is stored in a given address in the RAM 9b as defined by the CPU 8, and, at the same time, is output by the CPU 8 to the D-A converter 10.

Described above is the operation of this anti-howl back device on the input audio signal containing a signal and an address signal; that is, the case wherein the CPU 8 gives an affirmative result of the decision on the presence of these signals.

Unlike the above, the operation of this device on a negative result of the decision given by the CPU 8 on the presence of these signals is as follows:

The CPU 8 in the manner described outputs its unique sampling signal, and in synchronism therewith, performs a sampling of the audio signal fed into the A-D converter 7 by the selector circuit 6, followed by the quantization and encoding thereof. The data thus obtained is held in the A-D converter 7 while it is waiting for an instruction from the CPU 8.

This data is then fed into the CPU 8, thus being stored in a given address in the RAM 9b and at the same time is fed from the CPU 8 to the D-A converter 10.

Hence, this data is processed in the same manner as in the foregoing case regardless of the presence or absence of a synchronous signal and an address signal in the audio signal. That is, the above data can now be called new data as it does not contain any acoustic feedback component being identical to new data as derived from the aforementioned subtraction, and is processed in the same manner.

As described above, new data stored on one hand in a given address in the RAM 9b is, on the other hand, fed into the D-A converter 10 for a D-A conversion. The resultant PAM output signal is, with an instruction from the CPU 8, output from the D-A converter 10 with a given basic frequency so that there will be no deviation from a time axis.

In the meantime, the CPU 8 holds a synchronous signal and an address signal corresponding to the address wherein the corresponding data is stored and these signals, on an instruction from the CPU 8, cause the multiplexer 12 to operate so as to provide a serial delivery of the synchronous and address signals in synchronism with the basic frequency. The output from the multiplexer 12 is added to the audio signal restored by the low-pass filter 11.

FIG. 3(f) illustrates PAM signals output from the D-A converter 10; FIG. 3(g) illustrates the audio signal restored from the PAM signals after having passed through the low-pass filter 11. FIG. 3(h) illustrates those synchronous and address signals that are subject to addition to the audio signal. Illustrated in this figure are three pairs of synchronous and address signals, the pulse on each left hand side being the synchronous signal and the pulse string to the right thereof being the address signal.

The audio signal which is added to the synchronous and address signals is amplified by the power amplifier 4 and is in turn radiated through speakers 2a and 2b. In the event that speakers 2a and 2b are not capable of radiating such high frequency vibrations as the synchronous and address signals, transducers, as have been described already, are provided in parallel with speakers 2a and 2b so as to radiate such high frequency vibrations.

Acoustic signals radiated through speakers 2a and 2b, or through transducers are, together with voices uttered by both the talkers engaged in a dialogue, picked up again by microphones 1a and 1b. A digitalized re-entry signal, however, subtracts, when its presence has been determined by the presence of the synchronous and address signals, such a portion of the component as was stored in the RAM 9b, thus removing the acoustic feedback component, thereby resulting in the prevention of howling.

Furthermore, the synchronous and address signals radiated as an acoustic signal, upon being added to an audio signal at this time, as has already been mentioned, is a high frequency signal in the ultrasonic range, and is not, therefore, sensed by human auditory organs. It will not, therefore, be offensive to ones ears.

Further still, if, as has been described already, the signal level represented by the data stored in the RAM 9b and the level of a re-entry signal do not coincide, they can be matched by manipulating the volume of an interphone system. Automatic matching can also be possible as has been described already.

Figure 4:
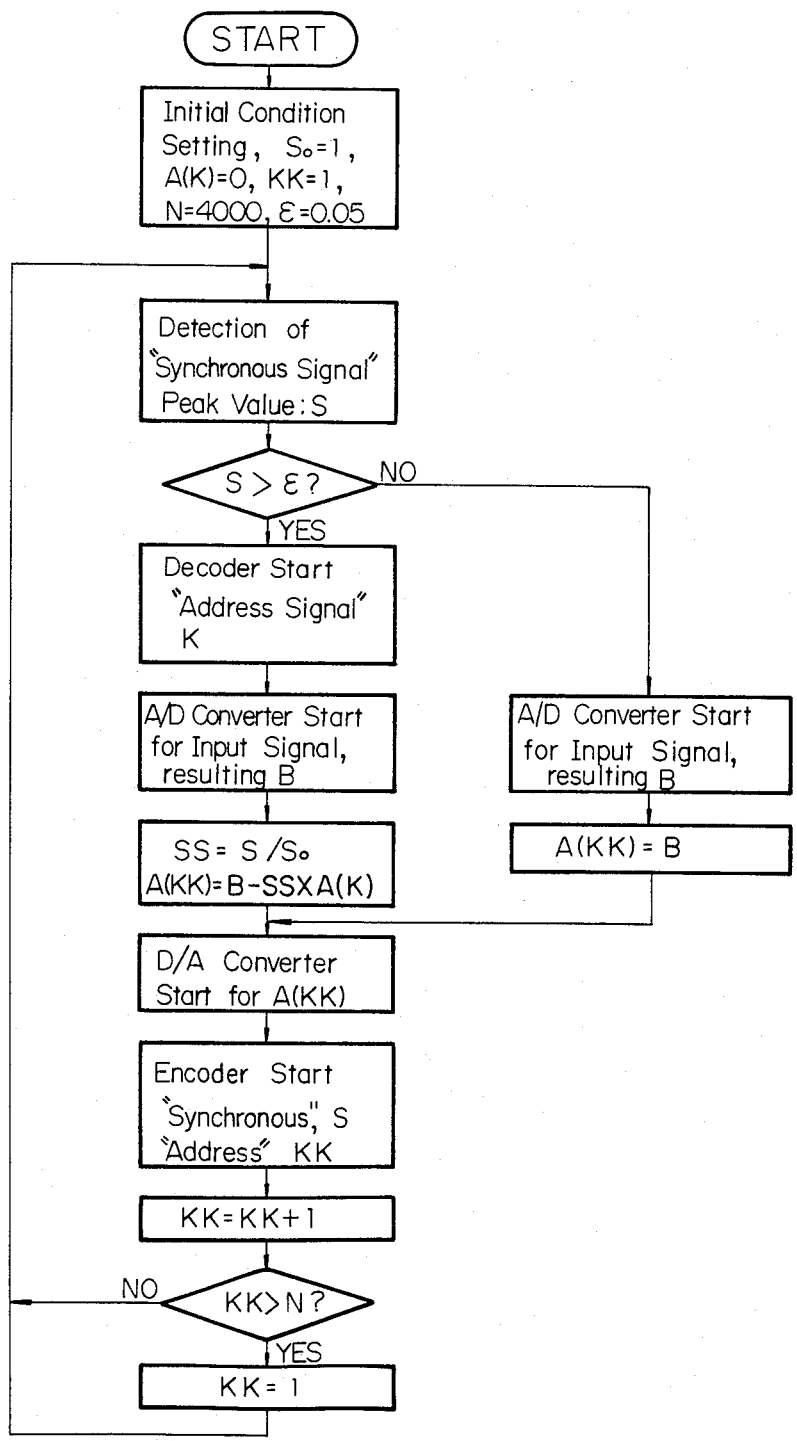
FIG. 4 is a flow chart of CPU program for an anti-howl back device in accordance with the present invention.

FIG. 4 illustrates the operation of the present invention. It is noted that the initial conditions are first set and the detection of the synchronous signal signal then takes place. The first decision box essentially corresponds to the decision made by the CPU with respect to the presence or absence of the combination signal comprising the synchronous signal and the address signal output from the selector circuit. In one case the A-D converter converts a sample of the audio signal obtained by a sampling performed in synchronism with the synchronous signal and then subtracts the data previously stored in the memory system.

On the other hand, upon the negative decision, the A-D converter merely converts the audio sample and stores such new data in the memory.

The D-A converter then converts the stored signal into an analog signal and then carries out the addition of the output of the D-A converter to the combination signal.

The address is then incremented and a determination is made to see if this address is valid. If so, the next detection of the synchronous signal takes place. If not, (that is—if all of the addresses have been checked), the address is reset at the beginning and the detection then again proceeds.

In accordance with this invention, therefore, simultaneous talks can be accomplished without the occurrence of howling.

While preferred embodiment of this invention has been described using an interphone system, such a description is for illustrative purpose only and it is to be understood that this invention will, when used for other cabled or wireless communication systems and audio systems, demonstrate adequate effectiveness in the prevention of howling.

What I claim is:

1. An anti-howl back device comprising:
  a selector circuit for separating an input signal into a combination signal comprising a synchronous signal and an address signal and into an audio signal;
  an A-D converter connected to said selector circuit for providing an A-D conversion of said audio signal;
  a CPU connected to said A-D converter and said selector circuit;
  a D-A converter connected to said CPU for providing a D-A conversion of signals which have been processed by said CPU;
  a multiplexer for adding said combination signal comprising a synchronous signal and an address signal to an output signal from said D-A converter;
  a memory system connected to said CPU for storing a program for operating said CPU and for storing data processed by said CPU;
  wherein said CPU makes a decision on the presence of said combination signal which is output from said selector circuit and, upon an affirmative result of such a decision, causes said A-D converter to carry out an A-D conversion of a sample of said audio signal obtained by a sampling performed in synchronism with said synchronous signal, and subtracts data fetched from an address in said memory system corresponding to said address signal which is combined with said synchronous signal from data which has been derived as a result of said A-D conversion, and stores new data corresponding to said subtraction in said memory system while concurrently feeding said new data to said D-A converter, and then causes said multiplexer to add an output from said D-A converter to said combination signal comprising said synchronous signal and said address signal and corresponding to the address of said new data that has been stored in said memory system; and, upon a negative result of such a decision, causes said A-D converter to carry out an A-D conversion of said audio sample and stores such new data thus obtained in said memory system while concurrently feeding such new data to said D-A converter, and then causes said multiplexer to add an output from said D-A converter to said combination signal comprising said synchronous signal and said address signal and corresponding to said address of said new data that has been stored in said memory system.

2. An anti-howl back device as claimed in claim 1, wherein said CPU makes a decision on presence of said combination signal comprising said synchronous signal and said address signal output from said selector circuit, feeds an audio sampling signal into a sampling circuit of said A-D converter and reads out data stored in an address corresponding to said address signal from said memory system and, while said A-D converter is converting said sampled audio signal, compares a level of said input synchronous signal with that of said synchronous signal output from said CPU so as to determine a proportional ratio, and subsequently corrects data thus fetched using said proportional ratio and then subtracts said data thus corrected from data output from said A-D converter.

* * * * *